United States Patent
Freymiller et al.

(10) Patent No.: US 10,213,050 B2
(45) Date of Patent: Feb. 26, 2019

(54) GRILLING APPLIANCE WITH AUTOMATED PLATEN LEVELING AND GAP CALIBRATION SYSTEM

(71) Applicant: TAYLOR COMMERCIAL FOODSERVICE INC., Rockton, IL (US)

(72) Inventors: Otley Dwight Freymiller, Deerfield, WI (US); Ronald J. Glavan, Rockton, IL (US); Jeffrey L. Sands, Freeport, IL (US)

(73) Assignee: Taylor Commercial Foodservice Inc., Rockton, IL (US)

( * ) Notice: Subject to any disclaimer, the term of this patent is extended or adjusted under 35 U.S.C. 154(b) by 783 days.

(21) Appl. No.: 14/552,685

(22) Filed: Nov. 25, 2014

(65) Prior Publication Data
US 2015/0145503 A1    May 28, 2015

Related U.S. Application Data

(60) Provisional application No. 61/908,809, filed on Nov. 26, 2013.

(51) Int. Cl.
*A47J 37/06* (2006.01)
*G01B 7/14* (2006.01)

(52) U.S. Cl.
CPC ............. *A47J 37/0611* (2013.01); *G01B 7/14* (2013.01); *A47J 2037/0617* (2013.01)

(58) Field of Classification Search
CPC ................. A47J 37/0611; A47J 2037/0617; A47J 27/62; A47J 37/067; B30B 15/007; B30B 15/24
See application file for complete search history.

(56) References Cited

U.S. PATENT DOCUMENTS

| | | | |
|---|---|---|---|
| 2,484,908 A | 10/1949 | Purcell | |
| 3,407,724 A | 10/1968 | Heiberger | |
| 4,352,560 A | 10/1982 | Nessel | |
| 5,143,386 A | 9/1992 | Uriarte | |
| 5,910,207 A | 6/1999 | Newton | |
| 5,934,182 A | 8/1999 | Harter | |
| 5,948,700 A | 9/1999 | Zheng | |
| 7,208,896 B2 | 4/2007 | Ford et al. | |
| 8,075,816 B2 * | 12/2011 | Kundinger | B29C 51/38 264/40.1 |

(Continued)

FOREIGN PATENT DOCUMENTS

| | | |
|---|---|---|
| JP | H02143824 A | 6/1990 |
| JP | H0386016 A | 4/1991 |

(Continued)

*Primary Examiner* — Alesa Allgood
(74) *Attorney, Agent, or Firm* — Brinks Gilson & Lione

(57) ABSTRACT

A method of calibrating a grill is provided including performing a first calibration run. A first calibration run includes monitoring a current of a leveling mechanism as the first grilling surface moves into contact with a second opposite grilling surface to determine a first location of the grilling surface. The current of the leveling mechanism is also monitored as the first grilling surface moves out of contact with the second grilling surface to determine a second location of the first grilling surface. A first calibration setting including the first location and the second location is stored in the control.

14 Claims, 8 Drawing Sheets

(56) References Cited

U.S. PATENT DOCUMENTS

| | | |
|---|---|---|
| 8,372,459 B2 | 2/2013 | Owensby et al. |
| 8,833,243 B2 * | 9/2014 | Sands .................. A47J 37/0611 100/258 A |
| 2006/0104766 A1 | 5/2006 | Ford |
| 2009/0139411 A1 | 6/2009 | Sands |
| 2010/0270696 A1 | 10/2010 | Kundinger |
| 2013/0071534 A1 | 3/2013 | Newton |

FOREIGN PATENT DOCUMENTS

| | | |
|---|---|---|
| JP | 2004050590 A | 2/2004 |
| WO | 2014144335 A1 | 9/2014 |

* cited by examiner

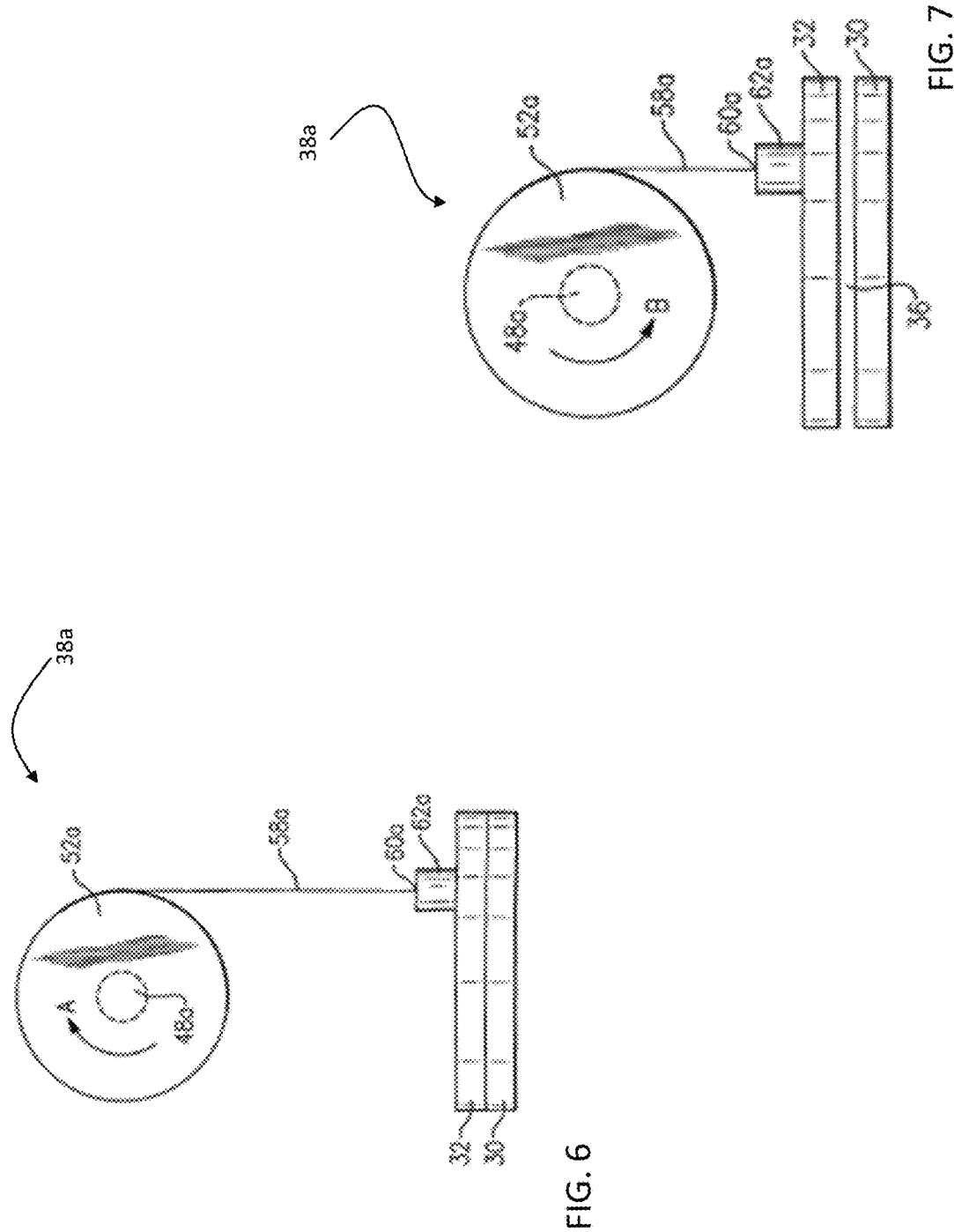

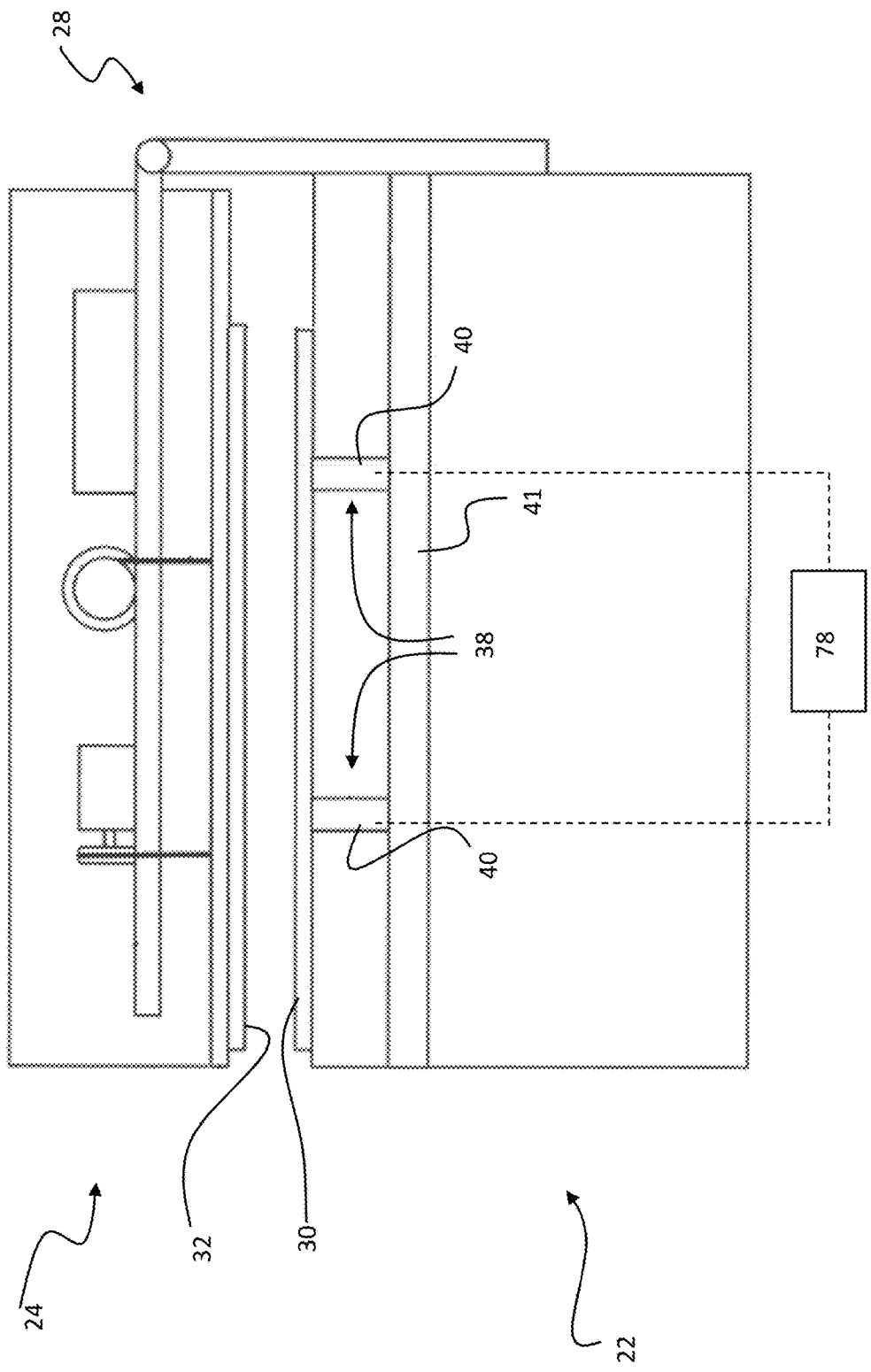

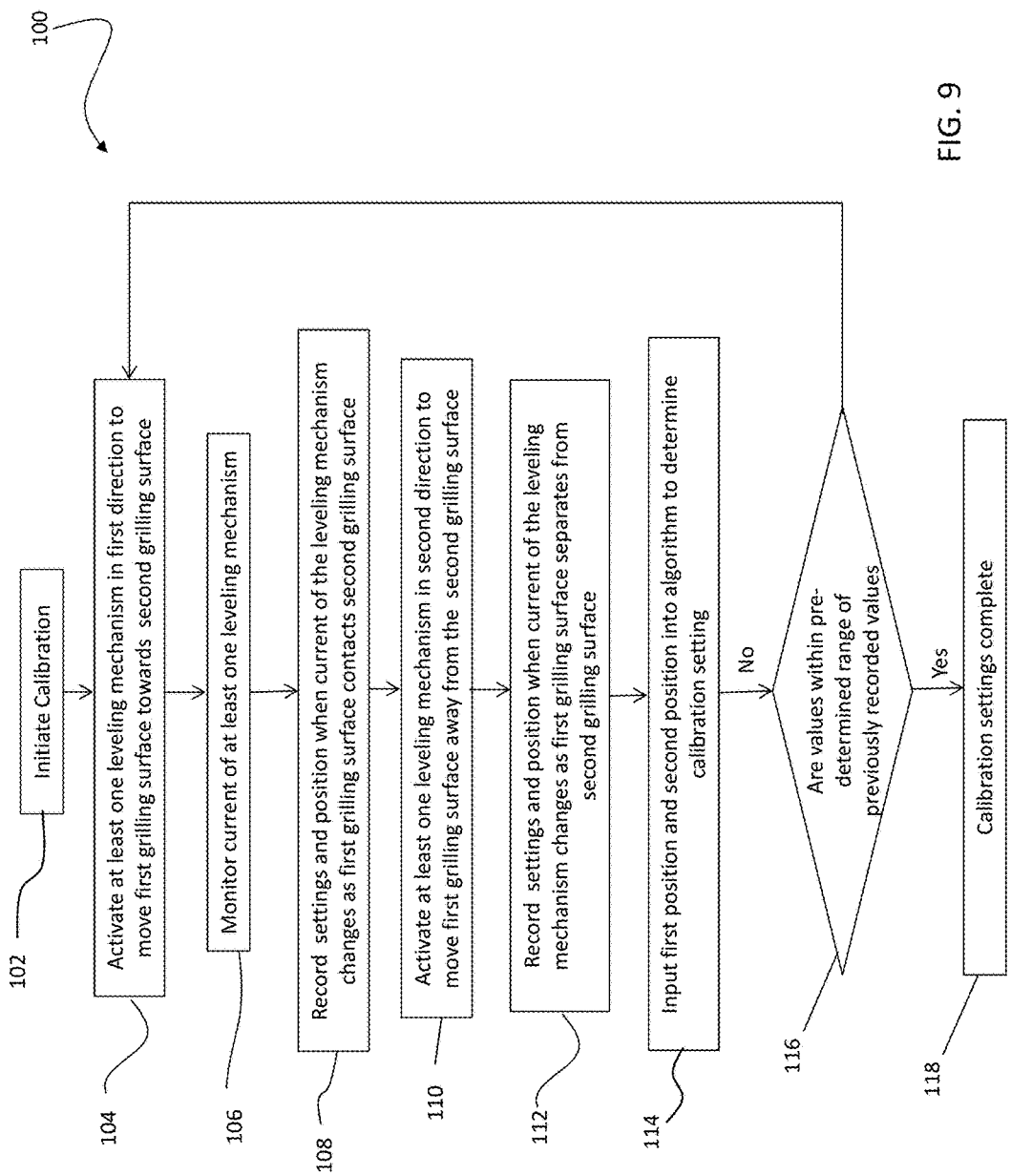

GRILLING APPLIANCE WITH AUTOMATED PLATEN LEVELING AND GAP CALIBRATION SYSTEM

CROSS-REFERENCE TO RELATED APPLICATION

This application claims the benefit of U.S. provisional patent application Ser. No. 61/908,809 filed Nov. 26, 2013, the entire contents of which are incorporated herein by reference.

BACKGROUND OF THE INVENTION

The present invention relates generally to a grill, and more particularly to a grill that automatically calibrates a gap between an upper grilling surface and a lower grilling surface.

Grills or griddles are used to cook various foods, such as hamburgers for example. In some conventional grills, the sides of the food are grilled sequentially. The food is placed on a grilling surface, thus grilling the side of the food that contacts the grilling surface. After that side of the food is cooked, the food is manually flipped to cook the opposite side. After both sides of the food are cooked, the food is manually removed from the grill for serving.

In other conventional grills, both sides of the good are grilled simultaneously. After manually programming the type of food into a control unit, the food is placed on a lower grilling surface. An upper platen assembly having an upper grilling surface is then lowered on the food, positioning the food in a gap between the upper and lower grilling surfaces to simultaneously grill both sides of the food. After a predetermined amount of time has passed, the upper platen assembly raises and the food is manually removed from the grill.

To ensure optimal performance, the upper grilling surface should be level to ensure that the upper grilling surface uniformly contacts the food. If the upper platen assembly is not level, a service technician must travel to the site to manually calibrate the grill. This requires additional cost and labor. Hence, there is a need in the art for a grill that automatically calibrates a gap between an upper grilling surface and a lower grilling surface and that overcomes the drawbacks of the prior art.

BRIEF DESCRIPTION OF THE INVENTION

According to an aspect of the invention, a method of calibrating a grill is provided including performing a first calibration run. A first calibration run includes monitoring a current of a leveling mechanism as the first grilling surface moves into contact with a second opposite grilling surface to determine a first location of the grilling surface. The current of the leveling mechanism is also monitored as the first grilling surface moves out of contact with the second grilling surface to determine a second location of the first grilling surface. A first calibration setting including the first location and the second location is stored in the control.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 6 schematically illustrates a side view of the motor when rotating the disc in a first direction according to an embodiment of the invention;

FIG. 7 schematically illustrates a side view of the motor when rotating the disc in a second direction according to an embodiment of the invention;

FIG. 8 schematically illustrates a cross-sectional view of a grill according to an embodiment of the invention; and FIG. 9 schematically illustrates a method of calibrating a first grilling surface of the grill according to an embodiment of the invention.

DETAILED DESCRIPTION OF THE INVENTION

Figure 1:
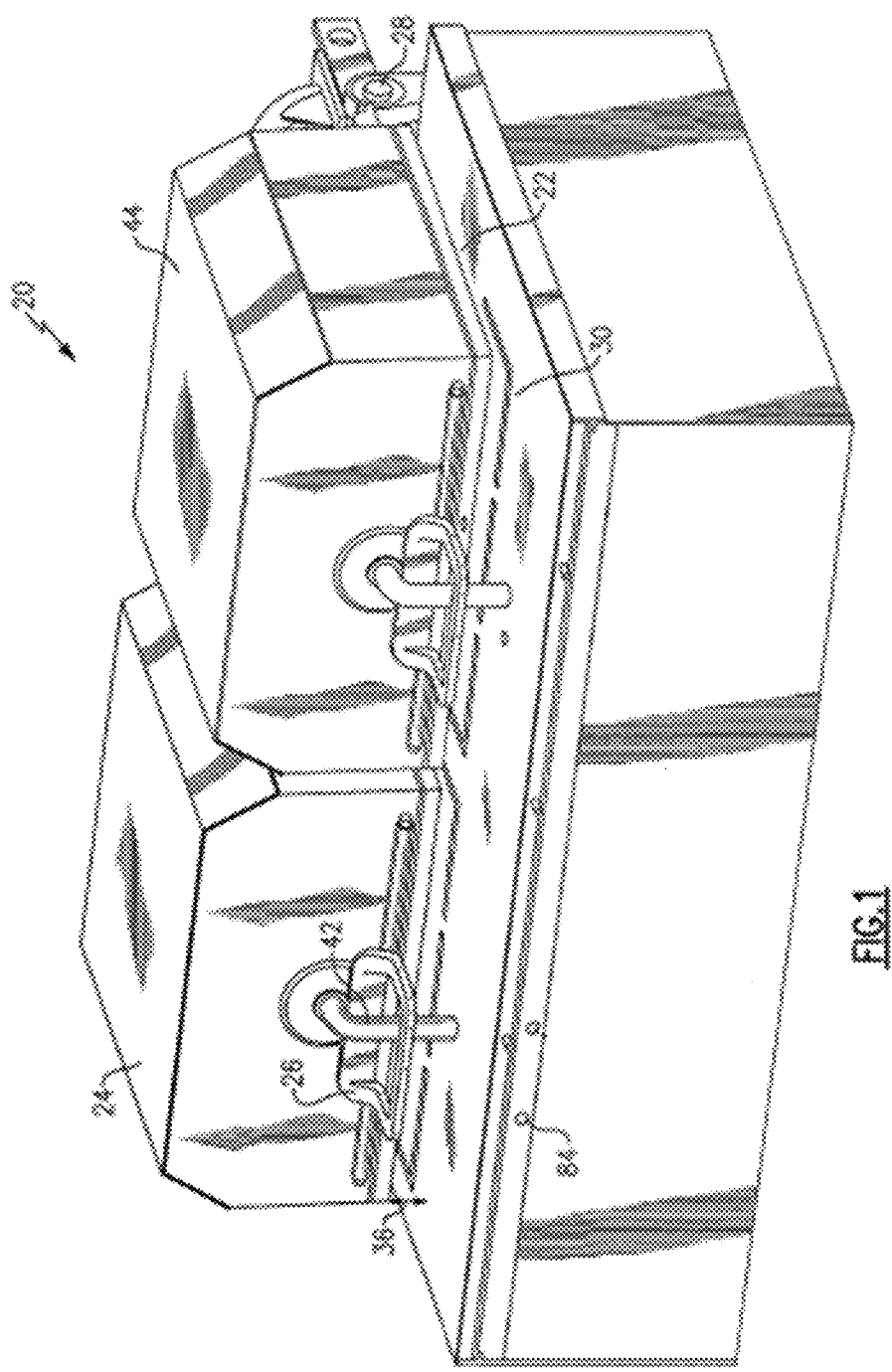
FIG. 1 schematically illustrates a perspective view of a grill in a lowered position according to an embodiment of the invention.
Figure 2:
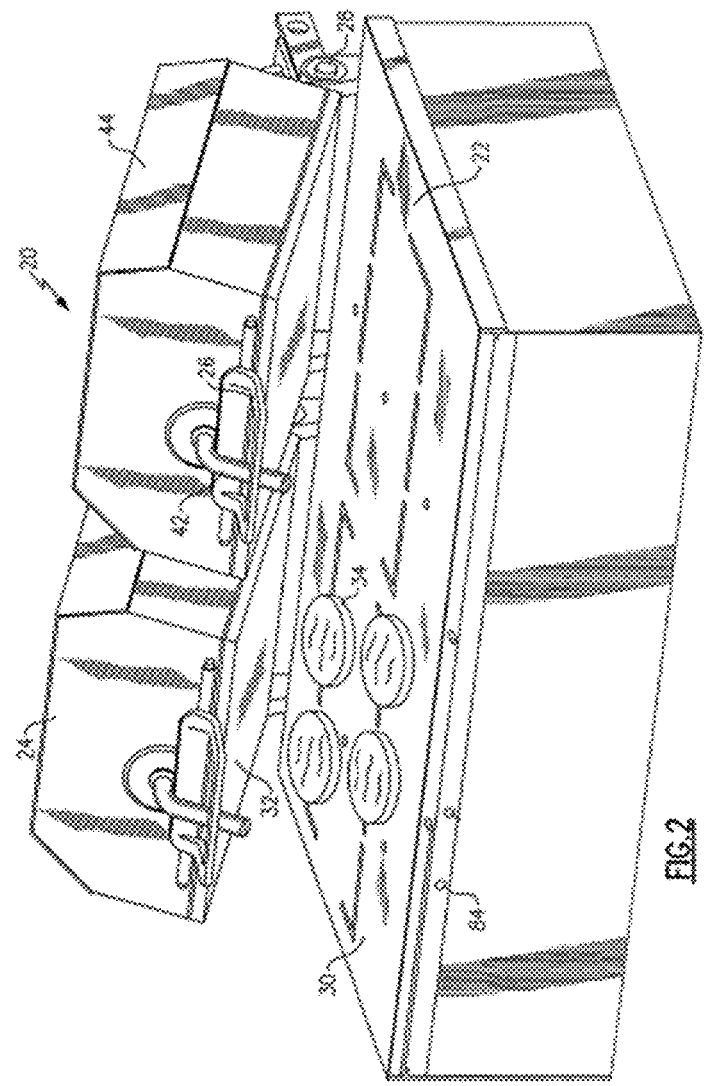
FIG. 2 schematically illustrates a perspective view of a grill in a raised position according to an embodiment of the invention.

Referring now to FIGS. 1 and 2, a grill 20 is illustrated in a lower position and a raised position, respectively. The grill 20 includes a lower platen assembly 22 and an upper platen assembly 24 movably attached to the lower platen assembly 22 by a mounting structure 28, such as a hinge for example. A handle 26 on the upper platen assembly 24 can be grabbed by an operator to move the upper platen assembly 24 relative to the lower platen assembly 22 between the lowered position and the raised position. The lower platen assembly 22 and the upper platen assembly 24 each include a respective grilling surface 30 and 32. When the upper platen assembly 24 is lifted by an operator to the raised position, the lower grilling surface 30 is exposed.

Food items 34 are placed on the lower grilling surface 30 by the operator for cooking. In one example, the food items 34 are hamburgers. The upper platen assembly 24 may be moved downwardly to the lowered position, either automatically or by an operator applying a force to the handle 26, positioning the food item 34 in a gap 36 between the lower grilling surface 30 and the upper grilling surface 32. An arm 42 contacts the lower grilling surface 30 to provide a mechanical stop that defines the gap 36 between the upper grilling surface 32 and the lower grilling surface 30. The grilling surfaces 30 and 32 are heated by a heater (not shown) to cook the food items 34.

Figure 3:
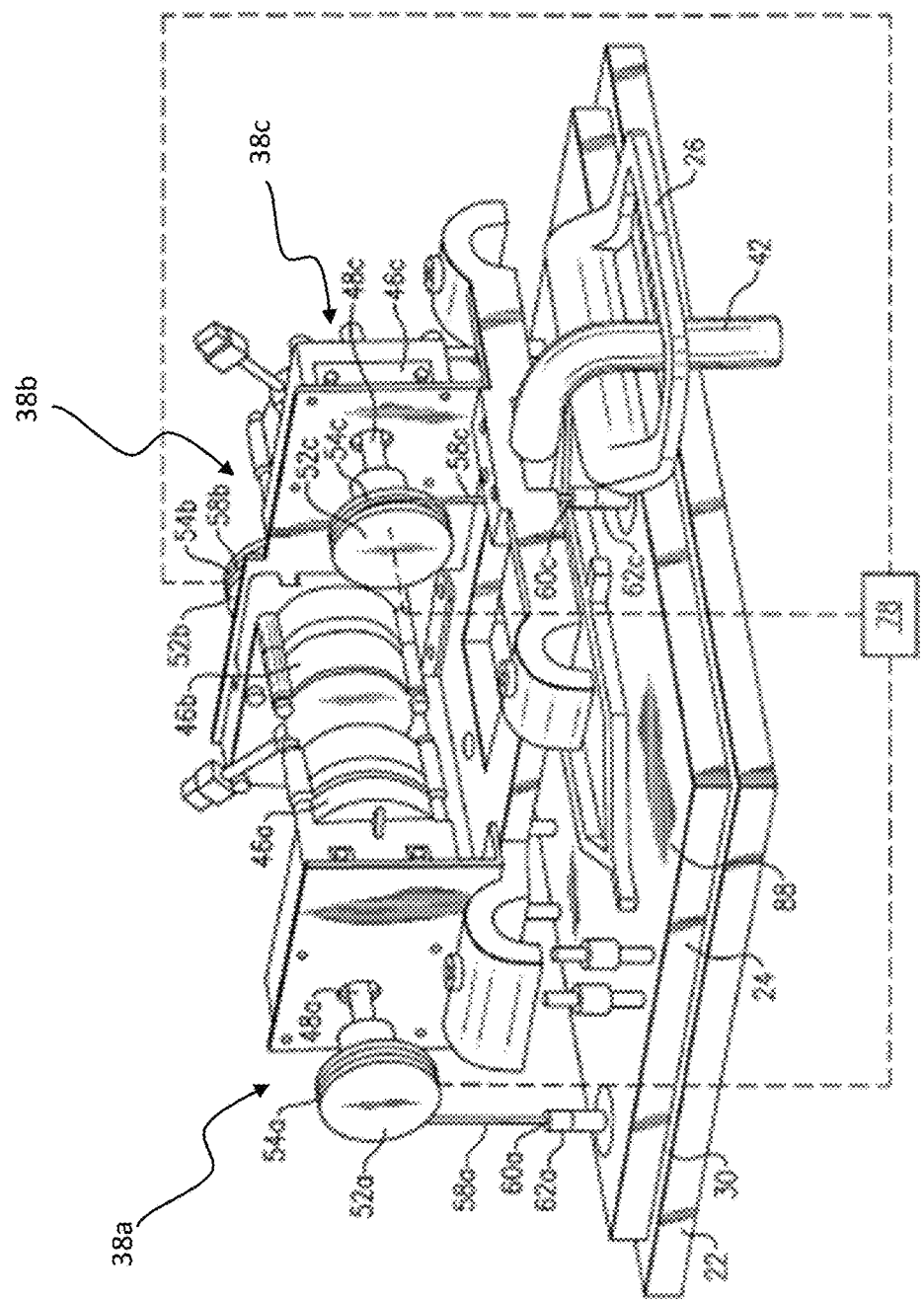
FIG. 3 schematically illustrates a perspective view of a grill in a lowered position with the shell removed according to an embodiment of the invention.
Figure 4:
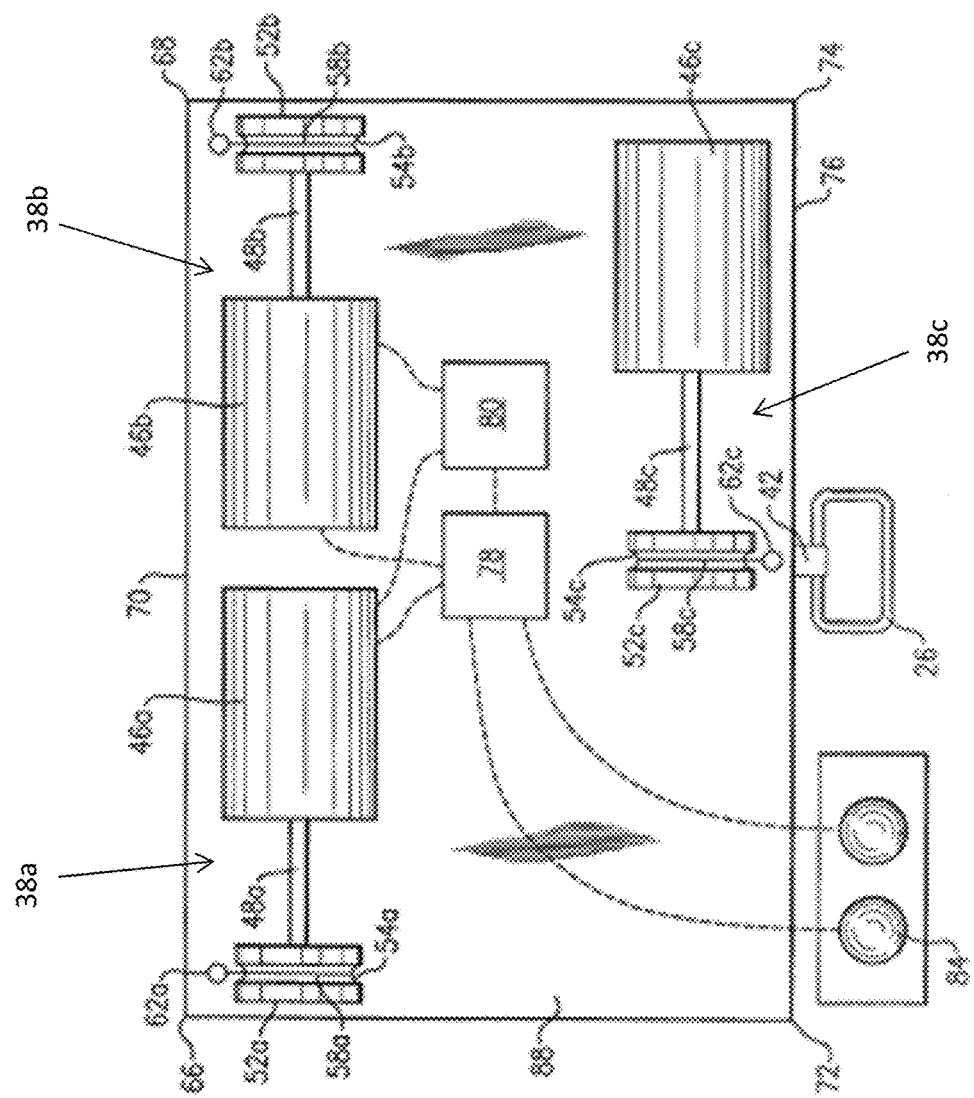
FIG. 4 schematically illustrates a top view of the grill with the shell removed.
Figure 5:
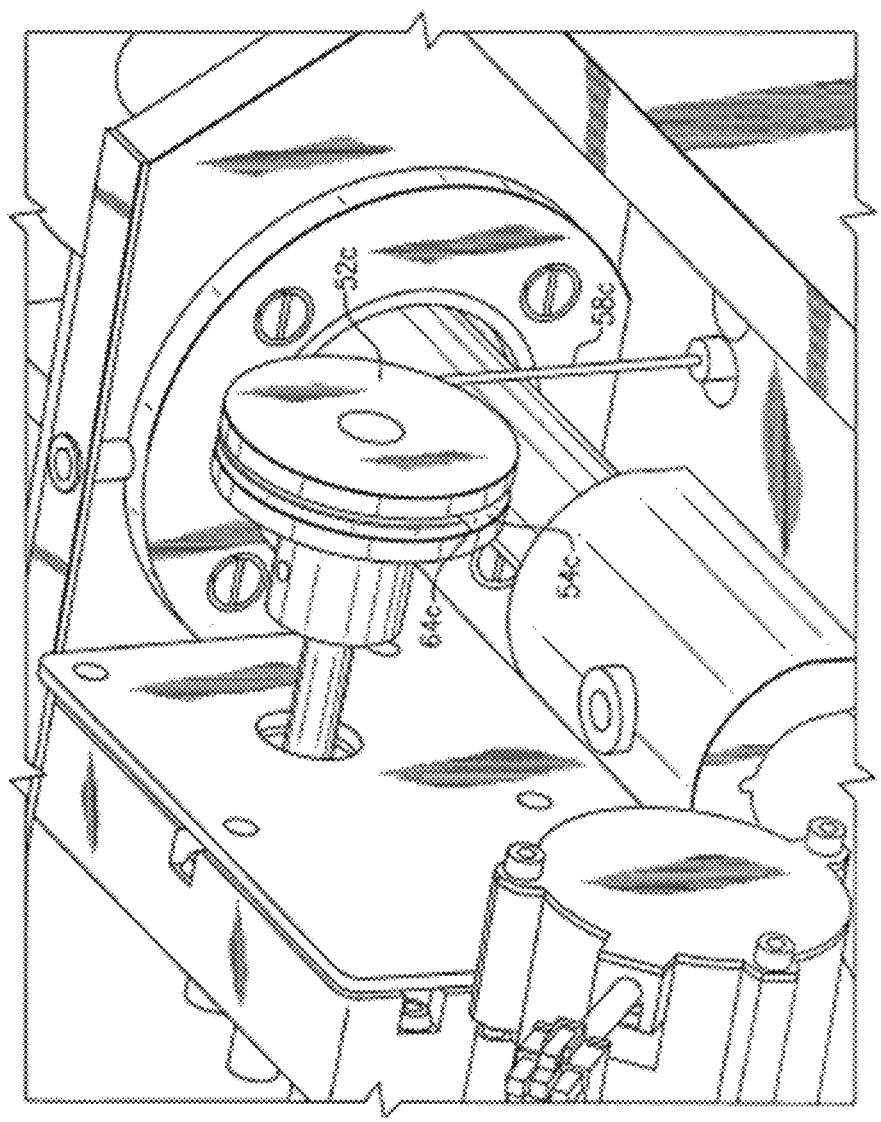
FIG. 5 schematically illustrates a perspective view of disc and a cable of a motor according to an embodiment of the invention.

As shown in FIGS. 3 and 4, the upper platen assembly 24 includes a plurality of leveling mechanisms 38, such as a three leveling mechanisms 38a, 38b, 38c tier example, configured to automatically level the upper grilling surface 32 relative to the lower grilling surface 30. In the illustrated, non-limiting embodiment, each leveling mechanism 38a, 38b, 38c is arranged within a shell 44 (see FIGS. 1 and 2) and includes a motor 46a, 46b, 46c and a disc 52a, 52b, 52c operably coupled to the shaft 48a, 48b, 48c of the motor 46a, 46b, 46c. A control 78 independently controls the motor 46a, 46b, 46c of each leveling mechanism 38a, 38b, 38c. The upper grilling surface 32 is suspended from a plurality of cables 58a, 58b, 58c arranged within a groove 54a, 54b, 54c of each rotatable disc 52a, 52b, 52c. A first end 60a, 60b, 60c of each cable 58a, 58b, 58c is attached to an upper surface 88 of the upper grilling surface 32 by an attachment member 62a, 62b, 62c. An opposing second end 64a, 64b, 64c of each cable 58a, 58b, 58c is attached in the groove 54a, 54b, 54c of a disc 52a, 52b, 52c of one of the plurality of leveling mechanisms 38a, 38b, 38c (FIG. 5). Although cables 58a, 58b, 58c are illustrated and described, other tension members, such as metal drive belts for example, are within the scope of the invention. In addition, although three leveling mechanisms 38a, 38b, 38c are illustrated and described herein, it is understood that any number of leveling mechanisms 38 can be used.

Returning to FIG. 4, a first cable 58a of the first leveling mechanism 38a may be attached near a first corner 66 of the upper surface 88 with the attachment member 62a, and a second cable 58b of the second leveling mechanism 38b may be attached near a second corner 68 of the upper surface 88 with the attachment member 62b. An edge 70 is located between the first corner 66 and the second corner 68. The third cable 58c may be attached to the upper surface 88 with the attachment member 62c at a location between a third corner 72 and a fourth corner 74 of the upper grilling surface 32. In one example, the attachment member 62c is substantially centrally between the third corner 72 and the fourth corner 74. An edge 76 opposite to the edge 70 is located between the third corner 72 and the fourth corner 74. Therefore, the cables 58a, 58b and 58c are attached to the upper surface 88 of the upper grilling surface 32 in a substantially triangular pattern. However, it is understood that any configuration of the cables 58a, 58b and 58c is possible. Each of the motors 46a, 46b and 46c operates independently to move and level a portion of the upper grilling surface 32 near the respective attachment members 62a, 62b and 62c.

As shown in FIG. 6, operation of a first leveling mechanism 38a by driving the motor 46a (not shown) in a first direction causes the disc 52a to rotate in the direction indicated by arrow A. As a result, the cable 58a of the first leveling mechanism 38a lengthens, lowering the upper grilling surface 32 toward the lower grilling surface 30. As shown in FIG. 7, as the motor 46a (not shown) rotates the disc 52a in an opposing second direction, indicated by arrow B, the cable 58a shortens and wraps around the disc 52a, raising the upper grilling surface 32 away from the lower grilling surface 30. Although only operation of the first leveling mechanism 38a is illustrated and described, each of the plurality of leveling mechanisms 38 operates in a similar manner.

In the illustrated, non-limiting embodiment, the lower platen assembly 22 is supported by a fixed surface or support structure. In another embodiment, illustrated in FIG. 8, the lower platen assembly 22 is configured to move respective to the upper grilling surface 32 and includes at least one leveling mechanism 38 for controlling the tilt, angle, and/or attitude of the grilling surface 30 of the lower platen assembly 22. The leveling mechanisms 38 may include a plurality of motor driven cables 58 similar to the leveling mechanisms shown in FIGS. 3-6, or may include one or more actuators 40 supported by an actuator support part 41. The leveling mechanisms 38 are coupled to the control 78 and are configured to operate independently to level a portion of the lower grilling surface 30.

The grill 20 is automatically calibrated to ensure that the gap 36 is maintained at the desired size between the lower grilling surface 30 and the upper grilling surface 32. By calibrated, it is meant that the upper grilling surface 32 and the lower grilling surface 30 are level to one another to ensure proper cooking of the food items 34 in the grill 20. In one example, the grill 20 is calibrated daily to correct any unleveling of either the upper or lower grilling surface 30, 32 that may have occurred during the previous day. However, if an operator notices that the upper and lower grilling surfaces 30, 32 are not level during use of the grill 20, for example by observing the appearance of the food items 34, the operator can initiate the auto-calibration sequence, such as by pressing a button 84 (FIG. 1) for example.

Referring now to FIG. 9, a method 100 of calibrating a first grilling surface of a grill 20, such as the upper grilling surface 32 for example, is illustrated. The method may be applied to either the upper grilling surface 32 or the lower gritting surface 30. When the calibration sequence is being performed, the second, opposite grilling surface, such as the lower grilling surface 30, is generally arranged in a predetermined reference position. In embodiments, where the upper grilling surface 32 is being calibrated, the lower grilling surface 30 may be fixed at the pre-determined position and in embodiments where the lower grilling surface 30 is being calibrated, the lowered position of the upper grilling surface 32 may be used as the pre-determined reference position. In block 102, the calibration sequence is initiated when an operator applies a force to button 84. Upon pressing the button 84, in block 104, the control 78 sends a signal to the plurality of leveling mechanisms 38a, 38b, 38c of the grilling surface being calibrated to move the first grilling surface in a first direction, towards the second grilling surface located at the pre-determined reference position. In block. 106, a sensor 80 detects the current, such as in the windings of the motors 46a, 46b, 46c, for example, of the plurality of leveling mechanisms 38a, 38b, 38c as the first grilling surface moves in the first direction. In one embodiment, the sensor 80 is a resistor. Although the sensor 80 is described as monitoring the current of the plurality of leveling mechanisms 38a, 38b, 38c, other types of sensors 80, such as a linear encoder or hall-effect sensor configured to monitor other characteristics of the plurality of leveling mechanisms, for example load or position, are within the scope of the invention.

When the first grilling surface contacts the second grilling surface, the current of the leveling mechanisms 38a, 38b, 38c change. For example, as the upper grilling surface 32 contacts the lower grilling surface 30, the weight of the upper grilling surface 32 is transferred from the cables 58a, 58b, 58c, to the lower grilling surface 30. By removing the weight of the upper grilling surface 32 from the cables 58a, 58b, 58c, additional power is required to drive the rotation of the discs 52a, 52b, 52c, and therefore the current in the windings of the motors 46a, 46b, 46c change. Similarly, when the first grilling surface is separated from the second grilling surface, the current of the leveling mechanisms 38a, 38b, 38c change. For instance, when the upper grilling surface 32 is lifted from the lower grilling surface 30, the weight of the upper grilling surface 32 is transferred from the lower grilling surface 30 back to the cables 58a, 58b, 58c. As the cables 58a, 58b, 58c begin to sustain the weight of the upper grilling surface 32, the tension in the cables 58a, 58b, 58c increases and therefore the current in the windings of the motors 46a, 46b, 46c change.

As the first grilling surface is moved into contact with the second grilling surface, the current is detected at each location of the first grilling surface. When the sensor 80 detects a change in current, this indicates that the first grilling surface is in contact with the second grilling surface. In block 108, when the percent change in the detected current increases over a threshold level, the calibration settings including the settings of the plurality of leveling mechanisms 38a, 38b, 38c and the recorded location of the first grilling surface are stored in the control 78.

In block 110, the control 78 sends a signal to the plurality of leveling mechanisms 38a, 38b, 38c of the first grilling surface to move the first grilling surface in a second direction, away from the second grilling surface. As the first grilling surface is moved out of contact with the second grilling surface, the current is detected at each location of the first grilling surface. When the sensor 80 detects a change in current, this indicates that the first grilling surface is completely separated from the second grilling surface. In block 112, when the percent change in the detected current increases over a threshold level, the calibration settings including the settings of the plurality of leveling mechanisms 38a, 38b, 38c and the recorded location of the first grilling surface are stored in the control 78. The two locations recorded during each calibration run are generally the boundaries of the level position of the first grilling surface. As shown in block 114, the two locations recorded during each calibration run are input into an algorithm, stored within the control 78, to generate a resultant calibration setting of the first grilling surface. In one embodiment, the algorithm is a weighted average of the first location and the second location.

The calibration steps in blocks 104 through 114 are then repeated. The plurality of leveling mechanisms 38a, 38b, 38c are operated, such as by driving the motors 46a, 46b, 46c to rotate the respective discs 52a, 52b, 52c in the first direction indicated by arrow A for example, to move the first grilling surface into contact with the second grilling surface. The current of the leveling mechanisms 38a, 38b, 38c is detected by the sensor 80. When the percent change in the current increases over a threshold level, the settings of the leveling mechanisms 38a, 38b, 38c and the location of the first grilling surface are stored in the control 78. The leveling mechanisms 38a, 38b, 38c operate to move the first grilling surface out of contact with the second grilling surface, such as by rotating the discs 52a, 52b, 52c in the second direction indicated by arrow B for example. When the percent change in the current increases over a threshold level, the settings of leveling mechanism 38a, 38b, 38c and the location of the first grilling surface are stored in the control 78. The locations recorded during the learn run are input into an algorithm resulting in a calibration setting.

In block 116, the settings of the leveling mechanisms 38a, 38b, 38c and the calculated locations stored within the control are compared to the previously stored settings and locations. If the settings and locations match within a given range, as shown in block 118, the calibration settings are complete and these values are stored and indicate the calibration settings of the leveling mechanisms 38a, 38b, 38c. If the settings of the motor 46a, 46b, 46c and the calculated locations of the first grilling surface do not match, the calibration steps illustrated in blocks 104-116 are repeated. The calibration steps are repeated until the settings and the locations match within a given range to the settings and locations stored during the previous set of calibration steps. By repeating the calibration steps multiple times, more accurate calibration can be ensured. Although the disclosed method of calibration identifies the calibration settings of the leveling mechanisms 38a, 38b, 38c by detecting a percent change in the current over a threshold level, it is to be understood that the calibration settings can also be determined by detecting a specific current or an average current. In addition, although the disclosed method is described to calibrate the upper and lower grilling surfaces 30, 32, the method may be used to determine a distance between a first surface and a second opposing surface, such as performed during item recognition liar example.

The calibration steps as described herein are performed using the plurality of leveling mechanisms 38 simultaneously. However, each of the leveling mechanisms 38 may be calibrated individually and sequentially, in any order. In embodiments where each of the plurality of leveling mechanisms 38 is calibrated individually, the calibration settings of each leveling mechanism 38 that result in the leveling of the first grilling surface are stored in the control 78.

The calibration method described herein provides automated maintenance of the grill 20 without the use of additional sensors or hardware. The two locations of the first grilling surface, identified when the current of the leveling mechanisms 38 change, define the boundaries of the level position of the first grilling surface. As a result, the calibration settings of the plurality of leveling mechanisms are more accurate, leading to improved cooking reliability, consistency, and repeatability.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of calibrating a grill comprising:

performing a first calibration run including:

monitoring a current of a leveling mechanism as a first grilling surface moves into contact with a second, opposite grilling surface to determine a first location of the first grilling surface;

monitoring the current of a leveling mechanism as the first grilling surface moves out of contact with a second, opposite grilling surface to determine a second location of the first grilling surface; and storing a first calibration setting including the first location and the second location in a control.

2. The method according to claim 1, wherein the leveling mechanism includes a motor configured to move a portion of the first grilling surface.

3. The method according to claim 1, wherein the leveling mechanism is an actuator.

4. The method according to claim 1, wherein the first grill surface is an upper grill surface.

5. The method according to claim 1, wherein the first grill surface is a lower grill surface.

6. The method according to claim 1, further comprising:
comparing the first calibration setting with the second calibration setting; and
performing an additional calibration run if the second calibration setting is not within a given range of the first calibration setting.

7. The method according to claim 6, wherein the first calibration setting and the second calibration setting are used to determine a calibration point of the first grilling surface that levels the first grilling surface relative to the lower grilling surface.

8. The method according to claim 7, wherein the grill includes a plurality of leveling mechanisms.

9. The method according to claim 8, wherein the calibration point of the first grilling surface for each of the plurality of leveling mechanisms is determined individually and sequentially.

10. The method according to claim 8 wherein the calibration point of the first grilling surface for each of the plurality of leveling mechanisms is determined simultaneously.

11. The method according to claim 1, further comprising:
performing a second calibration run including:
monitoring the current of a leveling mechanism as the first grilling surface moves into contact with a second, opposite grilling surface to determine a third location of the first grilling surface;
monitoring the current of a leveling mechanism as the first grilling surface moves out of contact with a second, opposite grilling surface to determine a fourth location of the first grilling surface; and
storing a second calibration setting including the third location and the fourth location in a control.

12. The method according to claim 11, wherein the first location, second location, third location, and fourth location are determined by a percent change in the current over a threshold level.

13. The method according to claim 11, wherein the first location, second location, third location, and fourth location are determined when the current reaches a specific value.

14. The method according to claim 11, wherein the first location, second location, third location, and fourth location are determined based on an average current.

* * * * *

UNITED STATES PATENT AND TRADEMARK OFFICE
CERTIFICATE OF CORRECTION

PATENT NO. : 10,213,050 B2
APPLICATION NO. : 14/552685
DATED : February 26, 2019
INVENTOR(S) : Otley Dwight Freymiller, Ronald J. Glavan and Jeffrey L. Sands Page 1 of 1

It is certified that error appears in the above-identified patent and that said Letters Patent is hereby corrected as shown below:

In the Claims

Claim 1, Column 6, Line 53, after "with" and before "second", delete "a" and insert --the--

Claim 7, Column 7, Line 10, after "the" and before "grilling", delete "lower" and insert --second--

Claim 11, Column 8, Line 4, after "with" and before "second", delete "a" and insert --the--

Claim 11, Column 8, Line 8, after "with" and before "second", delete "a" and insert --the--

Signed and Sealed this
Fourth Day of February, 2020

Andrei Iancu
*Director of the United States Patent and Trademark Office*